United States Patent
Yu et al.

(10) Patent No.: US 11,514,902 B2
(45) Date of Patent: *Nov. 29, 2022

(54) SPEECH RECOGNITION METHOD AND APPARATUS THEREFOR

(71) Applicant: LG ELECTRONICS INC., Seoul (KR)

(72) Inventors: Hyun Yu, Seoul (KR); Byeong Ha Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 517 days.

This patent is subject to a terminal disclaimer.

(21) Appl. No.: 16/541,874

(22) Filed: Aug. 15, 2019

(65) Prior Publication Data

US 2019/0371332 A1 Dec. 5, 2019

(30) Foreign Application Priority Data

Jul. 10, 2019 (KR) .......................... 10-2019-0083371

(51) Int. Cl.
*G10L 15/19* (2013.01)
*G10L 15/22* (2006.01)
(Continued)

(52) U.S. Cl.
CPC ............ *G10L 15/22* (2013.01); *G06F 40/242* (2020.01); *G10L 15/08* (2013.01); *G10L 25/78* (2013.01);
(Continued)

(58) Field of Classification Search
None
See application file for complete search history.

(56) References Cited

U.S. PATENT DOCUMENTS

| 2003/0074195 A1* | 4/2003 | Bartosik | G10L 15/22 |
| | | | 704/E15.04 |
| 2004/0030556 A1* | 2/2004 | Bennett | G06F 40/289 |
| | | | 704/E15.04 |

(Continued)

FOREIGN PATENT DOCUMENTS

| KR | 10-0825690 B1 | 4/2008 |
| KR | 10-0918644 B1 | 9/2009 |

*Primary Examiner* — Seong-Ah A Shin
(74) *Attorney, Agent, or Firm* — Birch, Stewart, Kolasch & Birch, LLP (57) ABSTRACT

A speech recognition apparatus and an operating method thereof which execute a mounted artificial intelligence (AI) algorithm and/or machine learning algorithm to perform speech recognition and communicate with different electronic apparatuses and external servers in a 5G communication environment are disclosed. A speech recognition method according to an exemplary embodiment of the present disclosure includes determining a temporary pause for reception of a first utterance sentence in the middle of the reception of the first utterance sentence, outputting a speech recognition processing result of a second utterance sentence which is received after the temporary pause, separately from the first utterance sentence, determining a third utterance sentence which is received after outputting the speech recognition processing result of the second utterance sentence as an extension of the first utterance sentence, and outputting a speech recognition processing result of a fourth utterance sentence obtained by combining the first utterance sentence and the third utterance sentence. According to the present disclosure, a delay occurring in the middle of reception of uttering speech is recognized as an uncompleted utterance to be temporarily stored and a speech recognition processing result for an additional uttering speech received after the delay is provided and then uttering speech which is input again and the uttering speech before the delay are (Continued)

recognized as completed utterance and a speech recognition processing result is provided to improve the speech recognition processing performance.

20 Claims, 5 Drawing Sheets

(51) Int. Cl.
*G10L 25/78* (2013.01)
*G10L 15/08* (2006.01)
*G06F 40/242* (2020.01)

(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 2005/0080625 A1* | 4/2005 | Bennett | G10L 17/22 704/E15.047 |
| 2005/0267759 A1* | 12/2005 | Jeschke | G10L 15/22 704/E15.04 |
| 2007/0078642 A1* | 4/2007 | Weng | G10L 15/19 704/4 |
| 2014/0012580 A1* | 1/2014 | Ganong, III | G10L 15/1815 704/E15.018 |
| 2014/0039895 A1* | 2/2014 | Aravamudan | G10L 15/187 704/257 |
| 2015/0261496 A1* | 9/2015 | Faaborg | G10L 15/00 715/728 |
| 2015/0348551 A1* | 12/2015 | Gruber | G10L 15/1822 704/235 |
| 2018/0240459 A1* | 8/2018 | Weng | G06V 40/174 |
| 2019/0051289 A1* | 2/2019 | Yoneda | G10L 15/32 |
| 2019/0180741 A1* | 6/2019 | Park | G10L 15/10 |

\* cited by examiner

SPEECH RECOGNITION METHOD AND APPARATUS THEREFOR

CROSS-REFERENCE TO RELATED APPLICATION

This present application claims benefit of priority to Korean Patent Application No. 10-2019-0083371, entitled "SPEECH RECOGNITION METHOD AND APPARATUS THEREFOR" and filed on Jul. 10, 2019, in the Korean Intellectual Property Office, the entire disclosure of which is incorporated herein by reference.

BACKGROUND

1. Technical Field

The present disclosure relates to a speech recognition method and a speech recognition apparatus, and more particularly, to a speech recognition method and a speech recognition apparatus which when an additional utterance sentence for obtaining arbitrary information is received in the middle of reception of an utterance sentence, provide a speech recognition processing result for both the utterance sentence and the additional utterance sentence in an active state of a speech recognition function.

2. Description of the Related Art

As technology continues to advance, various services using a speech recognition technology have been introduced in a number of fields in recent years. A speech recognition technology can be understood as a series of processes of understanding utterances spoken by a speaker and converting the spoken utterance to text data recognizable and usable by computers. Furthermore, the speech recognition services using such a speech recognition technology may include a series of processes for recognizing user's spoken utterance and providing a service appropriate thereto.

The related art 1 discloses a conversation system and a conversation sentence generating method which generate conversation sentences by collecting and interconnecting actually used sentences and words when conversation is directly performed from the viewpoint of a listener or a speaker and output a sentence appropriate for a situation of the speaker and the other party by modifying and expanding the definition of the word.

The related art 2 discloses a recognition error correcting method in a speech recognition system which automatically corrects an error included in a result of a speech recognizer and easily adopts the speech recognizer in a new area.

In a device (for example, a speech recognizing speaker) mounted with a speech recognizing function as disclosed in the related arts 1 and 2, a delay may occur while a speaker utters to the device, that is, the user may hesitate because words necessary to complete the utterance does not come up momentarily or search the corresponding word through another route. Therefore, the device recognizes the above-described delay as the completed utterance and tries to process the uncompleted utterance so that wrong speech recognition processing result may be provided.

During the conversation between people, it is natural to pause in the middle of utterance and then continue the utterance after checking the necessary information, but the above-described device may not distinguish between the temporary pause of the utterance and the completion of the utterance.

The above-described background arts are technical information acquired by the inventor for the contents to be disclosed or derived from the contents to be disclosed so that it should not be considered as known arts disclosed to the general public prior to the filing of the contents to be disclosed.

RELATED ART DOCUMENT

Patent Document

Related Art 1: Korean Registered Patent Publication No. 10-0918644 (Registered on Sep. 16, 2009)

Related Art 2: Korean Registered Patent Publication No. 10-0825690 (Registered on Apr. 22, 2008)

SUMMARY OF THE INVENTION

An object to be achieved by the present disclosure is to solve the problem of the related art which recognizes the delay occurring in the middle of utterance as the completion of the utterance and tries to process the uncompleted utterance to provide a wrong speech recognition processing result.

Another object of the present disclosure is to solve the problem of the related art which cannot distinguish between the temporary pause of the utterance and the completion of the utterance.

Another object of the present disclosure is to provide a speech recognition processing result for both an utterance sentence and an additional utterance sentence when an additional utterance sentence for obtaining arbitrary information is received in the middle of reception of an utterance sentence.

Another object to be achieved by the present disclosure is to solve the problem of the related art which recognizes the delay occurring in the middle of utterance as the completion of the utterance and tries to process the uncompleted utterance to provide a wrong speech recognition processing result using an optimal process resource.

Another object of the present disclosure is to solve the problem of the related art, which cannot distinguish the temporary pause of the utterance from the completion of the utterance using the optimal process resource.

According to an aspect of the present disclosure, a speech recognition method may include providing a speech recognition processing result for both an utterance sentence and an additional utterance sentence in an active state of the speech recognition function when the additional utterance sentence for obtaining arbitrary information is received in the middle of reception of the utterance sentence.

Specifically, according to an aspect of the present disclosure, a speech recognition method may include determining a temporary pause for reception of a first utterance sentence in the middle of the reception of the first utterance sentence; outputting a speech recognition processing result of a second utterance sentence which is received after the temporary pause, separately from the first utterance sentence, determining a third utterance sentence which is received after outputting the speech recognition result of the second utterance sentence as an extension of the first utterance sentence, and outputting a speech recognition processing result of a fourth utterance sentence obtained by combining the first utterance sentence and the third utterance sentence.

According to the speech recognition method according to the exemplary embodiment, a delay occurring in the middle of reception of uttering speech is recognized as an uncompleted utterance to be temporarily stored and a speech recognition processing result for an additional uttering speech received after the delay is provided and then an uttering speech which is input again and the uttering speech before the delay are recognized as a completed utterance and a speech recognition processing result is provided to improve the speech recognition processing performance.

Further, the determining of a temporary pause for reception of a first utterance sentence may include recognizing a temporary pause signal for reception of the first utterance sentence when a filled pause as a non-linguistic element is included in the first utterance sentence in the middle of reception of the first utterance sentence and determining a temporary pause for reception of the first utterance sentence based on the recognition of the temporary pause signal.

Further, the recognizing of a temporary pause signal for reception of a first utterance sentence may include recognizing one or more words from the first utterance sentence; comparing the word with a word of a previously built filled pause dictionary, and determining the word as a temporary pause signal for reception of the first utterance sentence when the word coincides with the word of the filled pause dictionary as a comparison result.

Further, the determining of a temporary pause for reception of a first utterance sentence may include determining a temporary pause for reception of the first utterance sentence when a silent delay occurs for a predetermined time in the middle of reception of the first utterance sentence.

Further, the determining of a temporary pause for reception of a first utterance sentence may include determining a temporary pause for reception of the first utterance sentence when a predetermined keyword for determining a temporary pause is included in the first utterance sentence in the middle of reception of the first utterance sentence.

According to the aspect of the present disclosure, it is possible to distinguish the temporary pause of the utterance from the completion of the utterance by the determining of a temporary pause for reception of the first utterance sentence, thereby improving the speech recognition processing performance.

Further, according to an aspect of the present disclosure, a speech recognition processing method may further include waiting for speech recognition processing for the first utterance sentence received before the temporary pause when the temporary pause for the reception of the first utterance sentence is determined.

Further, according to the aspect of the present disclosure, the speech recognition processing method may further include initiating a speech recognition active state by receiving a trigger word before receiving the first utterance sentence.

Further, according to the aspect of the present disclosure, the speech recognition processing method may further include maintaining the speech recognition active state after outputting the speech recognition result of the second utterance sentence.

Further, even though an additional utterance sentence for obtaining arbitrary information is received in the middle of reception of utterance sentence, the speech recognition processing result for both the utterance sentence and the additional utterance sentence is provided in a state in which the speech recognizing function is activated, by the waiting, the initiating, and the maintaining according to the exemplary embodiment, thereby improving the speech recognition processing performance.

According to an aspect of the present disclosure, a speech recognition apparatus may include a first processing unit which determines a temporary pause for reception of a first utterance sentence in the middle of reception of the first utterance sentence; a second processing unit which outputs a speech recognition processing result of a second utterance sentence which is received after the temporary pause, separately from the first utterance sentence, a third processing unit which determines a third utterance sentence which is received after outputting the speech recognition result of the second utterance sentence as an extension of the first utterance sentence, and a fourth processing unit which outputs a speech recognition processing result of a fourth utterance sentence obtained by combining the first utterance sentence and the third utterance sentence.

By the speech recognition apparatus according to the exemplary embodiment, a delay occurring in the middle of reception of uttering speech is recognized as an uncompleted utterance to be temporarily stored and a speech recognition processing result for an additional uttering speech received after the delay is provided and then an uttering speech which is input again and the uttering speech before the delay are recognized as completed utterance to provide a speech recognition processing result, thereby improving the speech recognition processing performance.

Further, the first processing unit may be configured to recognize a temporary pause signal for reception of the first utterance sentence when a filled pause as a non-linguistic element is included in the first utterance sentence in the middle of reception of the first utterance sentence and determine the temporary pause for the reception of the first utterance sentence based on the recognition of the temporary pause signal.

Further, the first processing unit may be configured to recognize one or more words from the first utterance sentence, compare the word with a word of a previously built filled pause dictionary, and determine the word as the temporary pause signal for the reception of the first utterance sentence when the word coincides with the word of the filled pause dictionary as a comparison result.

Further, the first processing unit may be configured to determine a temporary pause for reception of the first utterance sentence when a silent delay occurs for a predetermined time in the middle of reception of the first utterance sentence.

Further, the first processing unit may be configured to determine a temporary pause for reception of the first utterance sentence when a predetermined keyword for determining a temporary pause is included in the first utterance sentence in the middle of reception of the first utterance sentence.

According to the exemplary embodiment, it is possible to distinguish the temporary pause of the utterance from the completion of the utterance by the first processing unit, thereby improving the speech recognition processing performance.

Further, the first processing unit may be configured to wait for speech recognition processing for the first utterance sentence received before the temporary pause when the temporary pause for the reception of the first utterance sentence is determined.

Further, the speech recognition apparatus according to an exemplary embodiment of the present disclosure may further include a pre-processing unit which initiates an active state of the speech recognition by receiving a trigger word before receiving the first utterance sentence.

Further, the second processing unit may be configured to maintain the active state of the speech recognition after outputting the speech recognition result of the second utterance sentence.

Further, even though an additional utterance sentence for obtaining arbitrary information is received in the middle of reception of an utterance sentence, the speech recognition processing result for both the utterance sentence and the additional utterance sentence is provided in a state in which the speech recognizing function is activated, by the first processing unit, the pre-processing unit, and the second processing unit according to the exemplary embodiment, thereby improving the speech recognition processing performance.

In addition, another method and another system for implementing the present disclosure and a computer-readable recording medium in which a computer program which executes the method is stored may be further provided.

Other aspects, features, and advantages other than those described above will become apparent from the following drawings, claims, and the detailed description of the present invention.

According to the present disclosure, a delay occurring in the middle of reception of uttering speech is recognized as an uncompleted utterance to be temporarily stored and a speech recognition processing result for an additional uttering speech received after the delay is provided and then an uttering speech which is input again and the uttering speech before the delay are recognized as a completed utterance to provide a speech recognition processing result, thereby improving the speech recognition processing performance.

Further, the speech recognition processing performance may be improved by distinguishing between the temporary pause of the utterance and the completion of the utterance.

Further, even though an additional utterance sentence for obtaining arbitrary information is received in the middle of reception of an utterance sentence, the speech recognition processing result for both the utterance sentence and the additional utterance sentence is provided in a state in which the speech recognizing function is activated, thereby improving the speech recognition processing performance.

Further, even though the speech recognition apparatus itself is a mass-produced uniform product, the user recognizes the speech recognition apparatus as a personalized device, so that an effect as a user-customized product may be achieved.

Further, when various services through speech recognition are provided, satisfaction of the user may be increased, and prompt and accurate speech recognition processing may be performed.

Further, a voice command intended by the user may be recognized and processed only using an optimal processor resource so that power efficiency of the speech recognition apparatus may be improved.

The effects of the present disclosure are not limited to those mentioned above, and other effects not mentioned can be clearly understood by those skilled in the art from the following description.

BRIEF DESCRIPTION

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

The above and other aspects, features, and advantages of the present disclosure will become apparent from the detailed description of the following aspects in conjunction with the accompanying drawings, in which.

DETAILED DESCRIPTION

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure.

The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second," and other numerical terms may be used herein only to describe various elements, but these elements should not be limited by these terms.

Furthermore, these terms such as "first," "second," and other numerical terms, are used only to distinguish one element from another element.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted.

Figure 1:
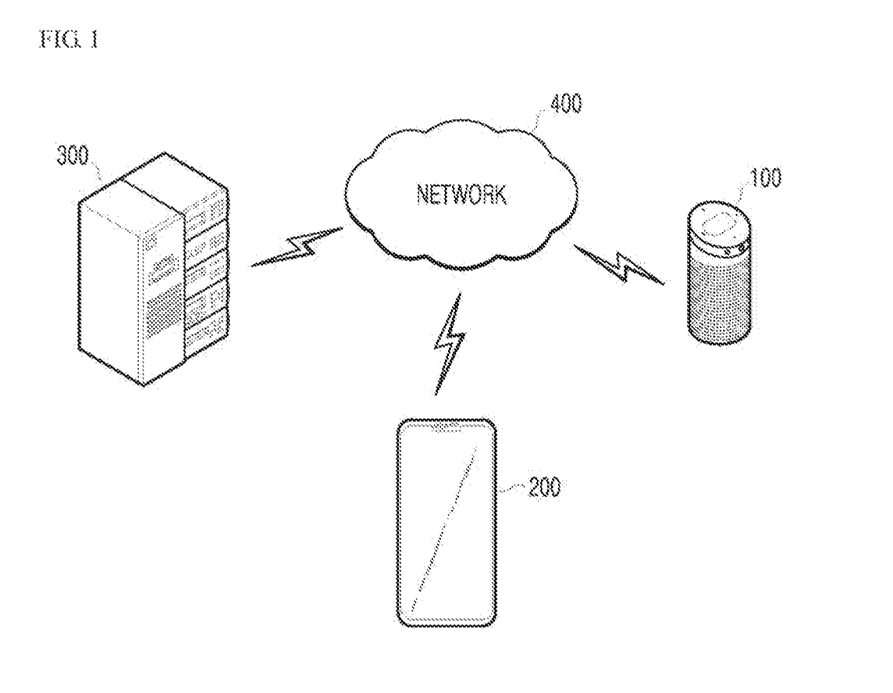
FIG. 1 is an exemplary view of a speech recognition environment including a speech recognition apparatus according to an exemplary embodiment of the present disclosure, a user terminal, a server, and a network connecting the above-mentioned components one another.

FIG. 1 is an exemplary view of a speech recognition environment including a speech recognition apparatus according to an exemplary embodiment of the present disclosure, a user terminal, a server, and a network connecting the above-mentioned components one another. Referring to FIG. 1, the speech recognition environment may include a speech recognition apparatus 100, a user terminal 200, a server 300, and a network 400. The speech recognition apparatus 100, the user terminal 200, and the server 300 are connected to one another in a 5G communication environment. Further, in addition to the devices illustrated in FIG. 1, various electronic apparatuses used at home or in the office may be connected to one another in the Internet of Things (IoT) environment to operate.

The speech recognition apparatus 100 may receive, recognize, and analyze an utterance sentence of the user to provide a speech recognition service. According to the exemplary embodiment, the speech recognition apparatus 100 may include various electronic apparatuses which perform a speech recognition function, such as an artificial intelligence (AI) speaker or a communication robot. Further, the speech recognition apparatus 100 may serve as a hub which controls an electronic apparatus which does not have a speech input/output function. Here, the speech recognition service may include receiving an utterance sentence of a user to distinguish a trigger word from the utterance sentence and outputting a speech recognition processing result for the utterance sentence to be recognizable by the user.

The utterance sentence may include a trigger word and an utterance sentence. The trigger word is a specific command which activates the speech recognition function of the speech recognition apparatus 100 and may be referred to as a wake-up word. When the trigger word is included in the utterance sentence, the speech recognition function may be activated and when the trigger word is not included in the utterance sentence, the speech recognition function maintains an inactive state (for example, a sleep mode). The trigger word may be set in advance to be stored in a memory 160 (see FIG. 3) to be described below.

Further, the utterance sentence is an utterance sentence which is processed after activating the speech recognition function of the speech recognition apparatus 100 by the trigger word and may include a voice command which is actually processed by the speech recognition apparatus 100 to generate an output. For example, when the user's utterance sentence is "Hi, LG. Turn on the air conditioner", the trigger word is "Hi, LG" and the utterance sentence is "Turn on the air conditioner." The speech recognition apparatus 100 may receive and analyze the utterance sentence of the user to determine the presence of the trigger word and execute the utterance sentence to control the air conditioner (not illustrated) as an electronic apparatus.

According to the exemplary embodiment, the speech recognition apparatus 100 may determine a temporary pause for the reception of a first utterance sentence in the middle of reception of the first utterance sentence in a state in which the speech recognition function is activated after receiving the trigger word, output a speech recognition processing result of a second utterance sentence which is received after the temporary pause, separately from the first utterance sentence, determine a third utterance sentence received after outputting the speech recognition result of the second utterance sentence as an extension of the first utterance sentence, and output a speech recognition processing result of a fourth utterance sentence obtained by combining the first utterance sentence and the third utterance sentence.

Here, the first utterance sentence may include a first voice command which is uttered by the user after uttering the trigger word and the first utterance sentence may include an incomplete utterance sentence. Further, the second utterance sentence may include a second voice command uttered after determining the temporary pause of the first utterance sentence and the second utterance sentence may include a complete utterance sentence. The third utterance sentence may include a third voice command uttered by the user after outputting a speech recognition processing result of the second utterance sentence and include an incomplete utterance sentence as a voice command which is determined as an extension of the first utterance sentence. The fourth utterance sentence may include a completed utterance sentence obtained by combining an uncompleted first utterance sentence and an uncompleted third utterance sentence. In the exemplary embodiment, the complete utterance sentence may include a voice command which may output the speech recognition processing result. Further, the incomplete utterance sentence may include a voice command (for example, <from Drama Iris> of FIG. 5) which cannot output the speech recognition processing result.

According to the exemplary embodiment, when the speech recognition apparatus 100 receives a voice command which is received from the user, that is, the utterance sentence after activating the speech recognition function by receiving a trigger word from the user, the speech recognition apparatus 100 may convert the received utterance sentence into a text using a sound model (not illustrated) and a language model (not illustrated) stored thereinside. The speech recognition apparatus 100 performs syntactic analysis or semantic analysis on the converted text to figure out an uttering intention and generates the text as a text of a natural language utterance form. Thereafter, the speech recognition apparatus 100 may convert the text of a natural language utterance form into voice information to output as a speech recognition processing result. In the exemplary embodiment, the speech recognition apparatus 100 which is in a speech recognition function active state after receiving the trigger word may autonomously perform the speech recognition function as described above to output the speech recognition processing result or transmit the utterance sentence to the server 300 and receive the speech recognition processing result from the server 300 to output the result.

The user terminal 200 may be provided with a service which monitors state information of the speech recognition apparatus 100, or operates or controls the speech recognition apparatus 100 through an authentication process after accessing a speech recognition operating application or a speech recognition operation site. According to the exemplary embodiment, for example, when the user terminal 200 on which the authentication process is completed receives a voice command of the user, the user terminal 200 may determine an operation mode of the speech recognition apparatus 100 to operate the speech recognition apparatus 100 or control the operation of the speech recognition apparatus 100.

The user terminal 200 may include a communication terminal which performs a function of a computing device (not illustrated). According to the exemplary embodiment, the user terminal 200 may include, but is not limited to: a desktop computer, a smart phone, a notebook, a tablet PC, a smart TV, a mobile phone, a personal digital assistant (PDA), a laptop computer, a media player, a micro server, a global positioning system (GPS), an electronic book terminal, a digital broadcasting terminal, a navigation, a kiosk, an MP3 player, a digital camera, home appliances, and other mobile or non-mobile computing devices, which are manipulated by the user. Further, the user terminal 200 may be a wearable terminal such as a watch, glasses, a hair band, and a ring with a communication function and a data processing function. The user terminal 200 is not limited thereto and a terminal which is capable of web-browsing may be adapted without restriction.

The server 300 may be a database server which provides big data required to apply various artificial intelligence algorithms and data for speech recognition. In addition, the server 300 may include a web server or an application server which enables the speech recognition apparatus 100 to be remotely controlled using an application or a web browser installed in the user terminal 200.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

When the server 300 determines a temporary pause for the reception of a first utterance sentence in the middle of reception of the first utterance sentence from the speech recognition apparatus 100 in which the speech recognition function is activated after receiving the trigger word, the server 300 may generate a speech recognition processing result of a second utterance sentence which is received from the speech recognition apparatus 100 after the temporary pause to transmit the speech recognition processing result to the speech recognition apparatus 100, determine a third utterance sentence received from the speech recognition apparatus 100 after outputting the speech recognition processing result of the second utterance sentence, as an extension of the first utterance sentence, and generate a speech recognition processing result of a fourth utterance sentence obtained by combining the first utterance sentence and the third utterance sentence to transmit the speech recognition processing result to the speech recognition apparatus 100.

Depending on the processing ability of the speech recognition apparatus 100, at least some of determining a temporary pause for the reception of the first utterance sentence, outputting of the speech recognition processing result of the second utterance sentence which is received after the temporary pause, separately from the first utterance sentence, determining the third utterance sentence received after outputting the speech recognition processing result of the second utterance sentence as an extension of the first utterance sentence, and outputting the speech recognition processing result of the fourth utterance sentence obtained by combining the first utterance sentence and the third utterance sentence may be performed by the speech recognition apparatus 100.

The network 400 may serve to connect the speech recognition apparatus 100 and the user terminal 200 to each other. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may also send and receive information using short distance communication and/or long distance communication. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. Access to the network 400 may be provided via one or more wired or wireless access networks. Further, the network 400 may support 5G communication and/or an Internet of things (IoT) network for exchanging and processing information between distributed components such as objects.

Figure 2:
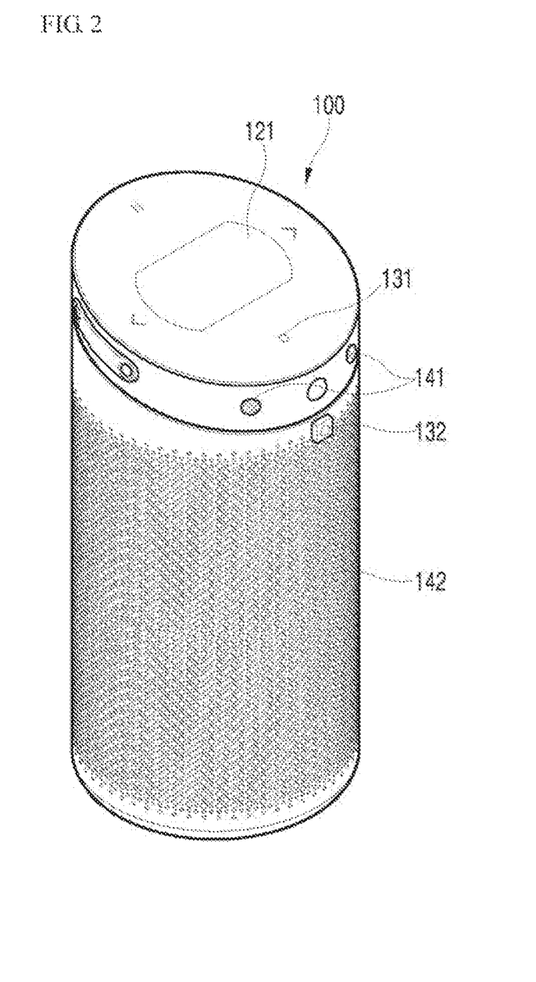
FIG. 2 is an exemplary view illustrating an outer appearance of a speech recognition apparatus according to an exemplary embodiment of the present disclosure.
Figure 3:
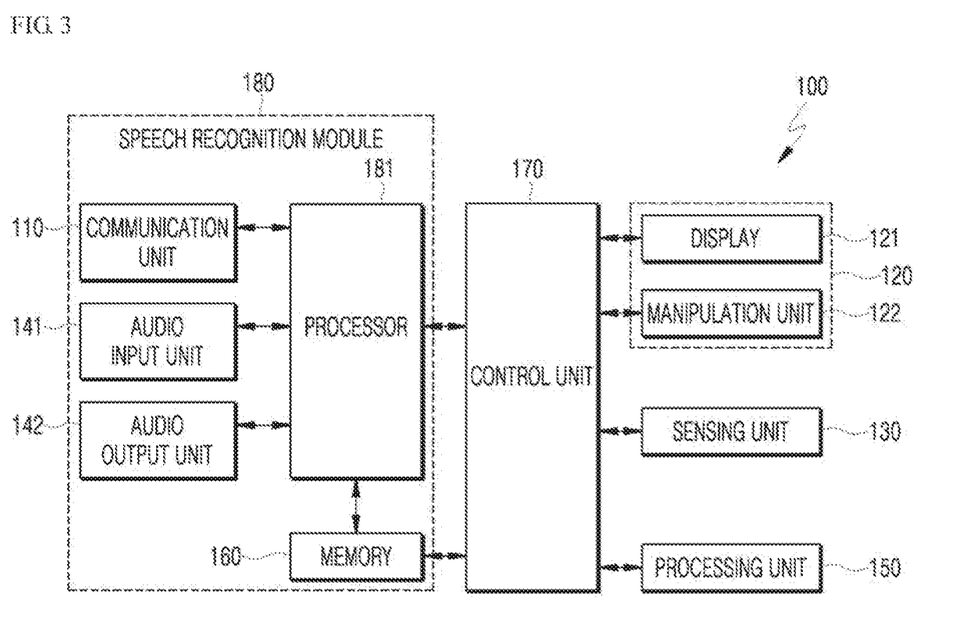
FIG. 3 is a schematic block diagram of a speech recognition apparatus according to an exemplary embodiment of the present disclosure.

FIG. 2 is an exemplary view illustrating an outer appearance of a speech recognition apparatus according to an exemplary embodiment of the present disclosure and FIG. 3 is a schematic block diagram of a speech recognition apparatus according to an exemplary embodiment of the present disclosure. In the following description, a repeated description of FIG. 1 will be omitted. Referring to FIGS. 2 and 3, the speech recognition apparatus 100 may include a communication unit 110, a user interface unit 120 including a display unit 121 and a manipulation unit 122, a sensing unit 130, an audio processing unit 140 including an audio input unit 141 and an audio output unit 142, a processing unit 150, a memory 160, a control unit 170, and a processor 181. According to the exemplary embodiment, the communication unit 110, the audio input unit 141, the audio output unit 142, the memory 160, and the processor 181 may be included in a speech recognition module 180.

The communication unit 110 may interwork with the network 400 to provide a communication interface required to provide a transmitted/received signal between the speech recognition apparatus 100 and other electronic devices and/or the user terminal 200 and/or the server 300 in the form of packet data. Moreover, the communication unit 110 may serve to receive a predetermined information request signal from the electronic device and/or the user terminal 200 and also serve to transmit information processed by the speech recognition apparatus 100 to the electronic device and/or the user terminal 200. Further, the communication unit 110 may transmit the predetermined information request signal from the electronic device and/or the user terminal 200 to the server 300 and receive a response signal processed by the server 300 to transmit the signal to the electronic device and/or the user terminal 200. Further, the communication unit 110 may be a device including hardware and software required to transmit and receive a signal such as a control signal or a data signal, through wired/wireless connection with other network devices.

According to the exemplary embodiment, other electronic devices may include a home appliance which does not include a speech input/output function, for example, an air conditioner, a refrigerator, and a washing machine and control the above-described home appliance by the speech recognition apparatus 100. Further, other electronic devices may include a home appliance which includes a speech input/output function, that is, a function as a speech recognition apparatus 100.

Further, the communication unit 110 may support various kinds of object intelligence communications (such as Internet of things (IoT), Internet of everything (IoE), and Internet of small things (IoST)) and may support communications such as machine to machine (M2M) communication, vehicle to everything communication (V2X), and device to device (D2D) communication.

The display unit 121 of the user interface unit 120 may display an operation state of the speech recognition apparatus 100 under the control of the control unit 170. According to an exemplary embodiment, the display unit 121 may form a mutual layered structure with a touch pad to be configured as a touch screen. In this case, the display unit 121 may also be used as the manipulation unit 122 to which information may be input by the touch of the user. To this end, the display unit 121 may be configured by a touch recognition display controller or other various input/output controllers. For example, the touch recognition display controller may provide an output interface and an input interface between the device and the user. The touch recognition display controller may transmit and receive an electrical signal to and from the control unit 170. Further, the touch recognition display controller displays a visual output to the user and the visual output may include a text, a graphic, an image, a video, and a combination thereof. Such a display unit 121 may be a predetermined display member such as an organic light emitting display (OLED), a liquid crystal display (LCD), or a light emitting display (LED) which is capable of recognizing the touch.

The manipulation unit 122 of the user interface unit 120 may include a plurality of manipulation buttons (not illustrated) to transmit a signal corresponding to an input button to the control unit 170. Such a manipulation unit 122 may be configured as a sensor, a button, or a switch structure which recognizes a touch or a pressing operation of the user. According to the exemplary embodiment, the manipulation unit 122 may transmit a manipulation signal which is manipulated by a user to check or change various information related to the operation of the speech recognition apparatus 100 displayed on the display unit 121, to the control unit 170.

According to the exemplary embodiment, the manipulation unit 122 may include first to fourth contact switches (not illustrated) and how to process an output signal of each contact switch may be determined by a program which has been stored in the memory 160 in advance. For example, menus displayed in a left direction or a right direction on the display unit 121 may be selected in accordance with an operation signal of a first contact switch or a second contact switch and menus displayed in an upper direction or a lower direction on the display unit 121 may be selected in accordance with an operation signal of a third contact switch or a fourth contact switch. Further, when one of the first to fourth contact switches is operated, the speech recognition function may be activated.

The sensing unit 130 may include a proximity sensor 131 and an image sensor 132 which sense the surrounding situation of the speech recognition apparatus 100. The proximity sensor 131 may obtain position data of an object (for example, a user) which is located in the vicinity of the speech recognition apparatus 100 by utilizing infrared ray or the like. In the meantime, the user's position data obtained by the proximity sensor 131 may be stored in the memory 160.

The image sensor 132 may include a camera (not illustrated) which photographs the surrounding of the speech recognition apparatus 100 and for more efficient photographing, a plurality of cameras may be provided. For example, the camera may include at least one optical lens, an image sensor (for example, a CMOS image sensor) configured to include a plurality of photodiodes (for example, pixels) on which an image is formed by light passing through the optical lens, and a digital signal processor (DSP) which configures an image based on signals output from the photodiodes. The digital signal processor may generate not only a still image, but also a moving image formed by frames configured by a still image. In the meantime, the image photographed by the camera serving as the image sensor 132 may be stored in the memory 160.

According to the exemplary embodiment, even though the sensing unit 130 is limited to the proximity sensor 131 and the image sensor 132, but the exemplary embodiment is not limited thereto. The sensing unit 130 may include sensors which sense the surrounding situation of the speech recognition apparatus 100, for example, include at least one of a Lidar sensor, a weight sensing sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a microphone, a battery gauge, an environment sensor (for example, a barometer, a hygrometer, a thermometer, a radiation sensor, a thermal sensor, or a gas sensor), and a chemical sensor (for example, an electronic nose, a healthcare sensor, or a biometric sensor). In the meantime, according to the exemplary embodiment, the speech recognition apparatus 100 may combine and utilize information sensed by at least two sensors from the above-mentioned sensors.

The audio input unit 141 of the audio processing unit 140 receives an uttering speech uttered by the user (for example, a trigger word and a voice command) to transmit the uttering speech to the control unit 170 and the control unit 170 may transmit the uttering speech uttered by the user to the speech recognition module 180. To this end, the audio input unit 141 may include one or more microphones (not illustrated). Further, a plurality of microphones (not illustrated) may be provided to more accurately receive the uttering speech of the user. Here, the plurality of microphones may be disposed to be spaced apart from each other in different positions and process the received uttering speech of the user as an electrical signal.

As a selective embodiment, the audio input unit 141 may use various noise removing algorithms to remove noises generated in the middle of reception of the uttering speech of the user. As a selective embodiment, the audio input unit 141 may include various components for processing the voice signal, such as a filter (not illustrated) which removes the noise at the time of receiving the uttering speech of the user and an amplifier (not illustrated) which amplifies and outputs a signal output from the filter.

The audio output unit 142 of the audio processing unit 140 may output a notification message such as an alarm, an operation mode, an operation state, or an error state, information corresponding to the input command of the user, and a processing result corresponding to the input command of the user as an audio signal in accordance with the control of the control unit 170. The audio output unit 142 may convert the electrical signal from the control unit 170 into an audio signal to output the audio signal. To this end, the audio output unit may include a speaker or the like.

The processing unit 150 may determine a temporary pause for the reception of a first utterance sentence in the middle of reception of the first utterance sentence in a state in which the speech recognition function is activated after receiving the trigger word, output a speech recognition processing result of a second utterance sentence which is received after the temporary pause, separately from the first utterance sentence, determine a third utterance sentence received after outputting the speech recognition result of the second utterance sentence as an extension of the first utterance sentence, and output a speech recognition processing result of a fourth utterance sentence obtained by combining the first utterance sentence and the third utterance sentence.

According to the exemplary embodiment, the processing unit 150 may be connected to the control unit 170 to perform the learning or receive the learning result from the control unit 170. According to the exemplary embodiment, the processing unit 150 may be equipped at the outside of the control unit 170 as illustrated in FIG. 3 or equipped in the control unit 170 to operate as the control unit 170 or provided in the server 300 of FIG. 1. Hereinafter, details of the processing unit 150 will be described with reference to FIG. 4.

The memory 160 may store various information required for the operation of the speech recognition apparatus 100 and include a volatile or non-volatile recording medium. For example, in the memory 160, a predetermined trigger word which determines the presence of the trigger word from the uttering speech of the user may be stored. In the meantime, the trigger word may be set by a manufacturer. For example, "Hi, LG" may be set as a trigger word and the setting may be changed by the user. The trigger word is input to activate the speech recognition apparatus 100 and the speech recognition apparatus 100 which recognized the trigger word uttered by the user may be switched to a speech recognition active state.

Herein, the memory 160 may include magnetic storage media or flash storage media, but the scope of the present disclosure is not limited thereto. The memory 160 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

Here, the simple speech recognition is performed by the speech recognition apparatus 100 and a high level of speech recognition such as natural language processing may be performed by the server 300. For example, when a word uttered by the user is a predetermined trigger word or an additional trigger word, the speech recognition apparatus 100 may be switched to a state to receive an utterance sentence as a voice command. In this case, the speech recognition apparatus 100 may perform only the speech recognition process for checking whether the trigger word voice is input and the speech recognition for the subsequent utterance sentence may be performed by the server 300. A system resource of the speech recognition apparatus 100 is limited so that complex natural language recognition and processing may be performed by the server 300.

The control unit 170 transmits an uttering speech received through the audio input unit 141 to the speech recognition module 180 and may provide the speech recognition processing result from the speech recognition module 180 through the display unit 121 as visual information or provide the speech recognition processing result through the audio output unit 142 as auditory information.

The control unit 170 is a sort of central processing unit and may drive control software installed in the memory 160 to control an overall operation of the speech recognition apparatus 100. The control unit 170 may include any types of devices which are capable of processing data such as a processor. Here, a processor may refer to a data processing device embedded in hardware which has a physically configured circuit to perform a function expressed by a code or a command included in a program. Examples of the data processing device built in a hardware include, but are not limited to, processing devices such as a microprocessor, a central processing unit (CPU), a processor core, a multiprocessor, an application-specific integrated circuit (ASIC), a field programmable gate array (FPGA), and the like.

According to the exemplary embodiment, the control unit 170 may perform machine learning such as deep learning on the speech uttered by the user to allow the speech recognition apparatus 100 to output an optimal speech recognition processing result and the memory 160 may store data used for the machine learning and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include deep neural networks such as a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

As described above, the control unit 170 may be provided with an artificial neural network and perform machine learning-based user recognition and user's voice recognition using received audio input signals as input data.

The control unit 170 may include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used. The control unit 170 may control to have a speech recognition artificial neural network structure to be updated after learning.

According to the exemplary embodiment, the communication unit 110, the audio input unit 141, the audio output unit 142, the memory 160, and the processor 181 may be included in a speech recognition module 180.

According to the exemplary embodiment, the speech recognition module 180 may include a communication unit 110 which transmits a driving signal corresponding to the voice command and/or various information to the user terminal 200 and/or the server 300, an audio input unit 141 which receives an uttering speech, an audio output unit 142 which outputs the speech recognition processing result as an audio signal, and a processor 181 which analyzes a voice command using the speech recognition algorithm to generate the speech recognition processing result.

Figure 4:
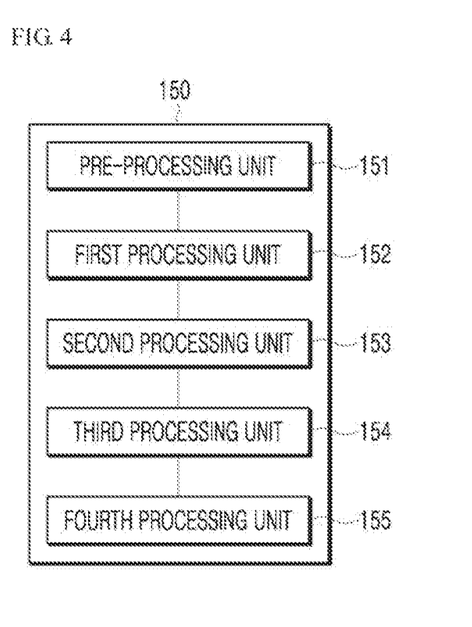
FIG. 4 is a schematic block diagram of a processing unit of the speech recognition apparatus of FIG. 3.

FIG. 4 is a schematic block diagram of a processing unit of a speech recognition apparatus of FIG. 3. Hereinafter, a repeated description of FIGS. 1 to 3 will be omitted. Referring to FIG. 4, the processing unit 150 may include a pre-processing unit 151, a first processing unit 152, a second processing unit 153, a third processing unit 154, and a fourth processing unit 155. According to the exemplary embodiment, the processing unit 150 may interwork with the speech recognition module 180.

The pre-processing unit 151 receives the trigger word before receiving the utterance sentence to initiate the active state of the speech recognition of the speech recognition apparatus 100. The pre-processing unit 151 converts the uttering speech uttered by the user into a text and compares the text with the trigger word which is previously set in the memory 160 to determine whether the uttering speech uttered by the user is a trigger word. As a comparison result, when the uttering speech uttered by the user coincides with the trigger word, the pre-processing unit 151 may initiate the speech recognition module 180 in the speech recognition active state.

After initiating the speech recognition active state of the speech recognition module 180, the first processing unit 152 may receive a first utterance sentence as a first voice command through the audio input unit 141, recognize a temporary pause signal for reception of the first utterance sentence in the middle of reception of the first utterance sentence, and determine a temporary pause for the reception of the first utterance sentence based on the recognition of the temporary pause signal.

Here, the first processing unit 152 may recognize the temporary pause signal for the reception of the first utterance sentence and determine the temporary pause for the reception of the first utterance sentence based on the recognition of the temporary pause signal as follows: First, when a filled pause as a non-linguistic element is included in the first utterance sentence in the middle of reception of the first utterance sentence, the first processing unit 152 may recognize the temporary pause signal for the reception of the first utterance sentence and determine the temporary pause for the reception of the first utterance sentence based on the recognition of the temporary pause signal. Here, the filled pause means an interjection with no meaning used when the user cannot speak spontaneously during the utterance and for example, may include non-linguistic elements such as a meaningless syllable or word including "hm", "well", "um", "uh huh", or the like. The first processing unit 152 may recognize one or more words from the first utterance sentence and compare the words with a word of the filled pause dictionary (not illustrated) which has been built in the memory 160 in advance. As a comparison result, when the recognized word coincides with the word of the filled pause dictionary, the first processing unit 152 may determine the word as the temporary pause signal for the reception of the first utterance sentence.

Second, when a silent delay is generated for a predetermined time (for example, three seconds) in the middle of reception of the first utterance sentence, the first processing unit 152 may recognize the temporary pause signal for the reception of the first utterance sentence and determine the temporary pause for the reception of the first utterance sentence based on the recognition of the temporary pause signal.

Third, when a predetermined keyword for determining the temporary pause is included in the first utterance sentence in the middle of reception of the first utterance sentence, the first processing unit 152 may recognize the temporary pause signal for the reception of the first utterance sentence and determine the temporary pause for the reception of the first utterance sentence based on the recognition of the temporary pause signal. Here, in the memory 160, as a keyword for determining the temporary pause, for example, "just a moment" may be stored. The first processing unit 152 recognizes one or more words from the first utterance sentence and compares the words with the keyword for determining the temporary pause stored in the memory 160. As a comparison result, when the recognized word coincides with the keyword for determining the temporary pause, the first processing unit 152 may determine the word as the temporary pause signal for the reception of the first utterance sentence.

When the temporary pause for the reception of the first utterance sentence is determined, the first processing unit 152 may wait for the speech recognition processing on the first utterance sentence which is received before the temporary pause and temporarily store the first utterance sentence in the memory 160. When the temporary pause for the reception of the first utterance sentence is determined, the first processing unit 152 may determine that there is an additional utterance sentence (a second utterance sentence) whose speech recognition processing result wants to be received, other than the first utterance sentence. That is, the waiting of the speech recognition processing for the first utterance sentence processed by the first processing unit 152 may be performed after the step of determining the temporary pause for the reception of the first utterance sentence and before the step of receiving the second utterance sentence by the second processing unit 153.

When the first processing unit 152 determines the temporary pause for the reception of the first utterance sentence, the second processing unit 153 may receive a second utterance sentence which is received after the temporary pause, separately from the first utterance sentence, and output the speech recognition processing result for the second utterance sentence. After the temporary pause of the first utterance sentence, the second processing unit 153 transmits a second utterance sentence as an additional utterance sentence received through the audio input unit 141 to the speech recognition module 180 and receives the speech recognition processing result from the speech recognition module 180 to output the speech recognition processing result through the audio output unit 142 and/or the display unit 121.

Here, the second processing unit 153 may maintain the speech recognition active state after outputting the speech recognition processing result of the second utterance sentence. The speech recognition processing apparatus of the related art maintains the speech recognition inactive state until a next trigger word is received after outputting the speech recognition processing result for the utterance sentence. In contrast, according to the exemplary embodiment, even after outputting the speech recognition processing result of the second utterance sentence, the speech recognition active state may be maintained. This is because it is determined that an utterance sentence (a third utterance sentence) received after outputting the speech recognition processing result for an additional utterance sentence (the second utterance sentence) is an extension of the first utterance sentence. More specifically, the speech recognition active state may be maintained until the fourth processing unit 155 outputs the speech recognition processing result for a fourth utterance sentence after the second processing unit 153 outputs the speech recognition processing result for the second utterance sentence.

After the second processing unit 153 outputs the speech recognition processing result of the second utterance sentence, a third utterance sentence which is received by the third processing unit 154 through the audio input unit 141 may be determined as an extension of the first utterance sentence.

The fourth processing unit 155 may output a speech recognition processing result of a fourth utterance sentence obtained by combining the first utterance sentence temporarily stored in the memory 160 and the third utterance sentence received by the third processing unit 154. The fourth processing unit 155 transmits a fourth utterance sentence obtained by combining the first utterance sentence temporarily stored in the memory 160 and the third utterance sentence received through the audio input unit 141 to the speech recognition module 180 and receives the speech recognition processing result from the speech recognition module 180 to output the speech recognition processing result through the audio output unit 142 and/or the display unit 121.

According to the exemplary embodiment, the processing unit 150 and/or the control unit 170 obtains a filled pause time period, a silent delay time period, and a keyword time period to determine a temporary pause period from the uttered speech of the user only using a deep neural network which is trained in advance to determine the temporary pause.

Figure 5:
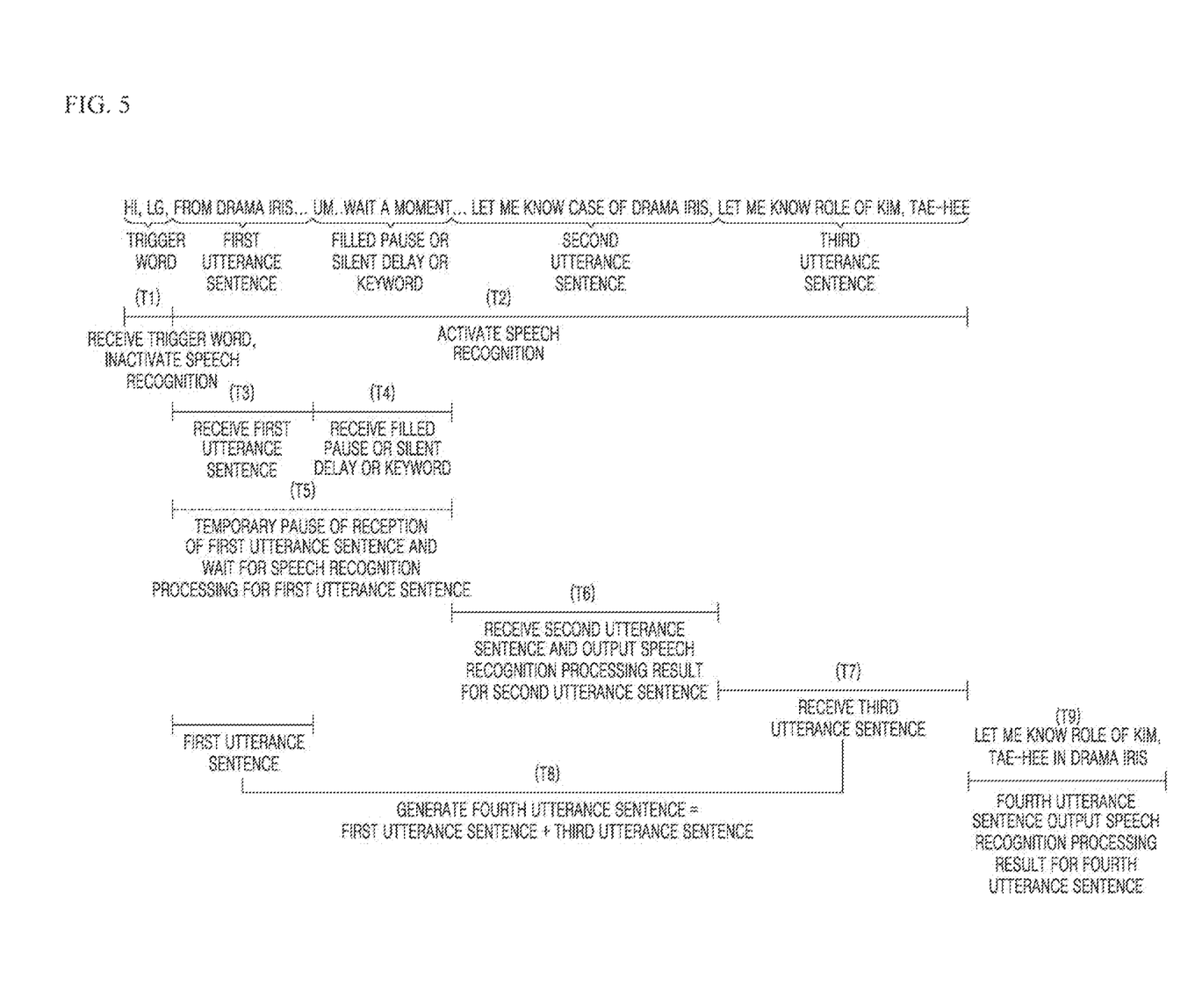
FIG. 5 is an exemplary view for explaining an operation of the processing unit of FIG. 4 in the order of time corresponding to an utterance sentence of a user.

FIG. 5 is an exemplary view for explaining an operation of a processing unit of FIG. 4 in the order of time corresponding to an utterance sentence of a user. Hereinafter, a repeated description of FIGS. 1 to 4 will be omitted. Referring to FIG. 5, it is assumed that the speech uttered by the user is <Hi, LG From the drama "Iris" . . . um . . . wait a moment, let me know the cast, let me know the role of KIM, Tae-hee>.

First, at a time T1, when the processing unit 150 receives the speech uttered by the user <Hi, LG>, the processing unit 150 may initiate the speech recognition active state of the speech recognition apparatus 100 at a time T2.

The processing unit 150 receives the speech uttered by the user <from the drama Iris> (first utterance sentence) at a time T3 and continuously receives < . . . um . . . Wait a moment> at a time T4. Here, < . . . um . . . Wait a moment> may be a filled pause and a keyword for temporary pause and the temporary pause of the first utterance sentence may be determined thereby.

At a time T5, the processing unit 150 allows the first utterance sentence to temporarily pause and temporarily stores the first utterance sentence (<from the drama Iris>) before the temporary pause in the memory 160 and set to be a speech recognition processing standby state.

After temporarily storing the first utterance sentence (<from the drama Iris>) before the temporary pause in the memory 160, at a time T6, the processing unit 150 may receive a speech uttered by the user <Let me know the cast of the drama Iris> (second utterance sentence) and output a speech recognition processing result for the second utterance sentence, for example, <The cast of Iris is LEE, Byung-hun and KIM, Tae-hee>.

After outputting the speech recognition processing result for the second utterance sentence, the processing unit 150 continuously maintains the speech recognition active state. At a time T7, when the processing unit 150 receives a speech uttered by the user <Let me know the role of KIM, Tae-hee> (third utterance sentence), at a time T8, the processing unit 150 may generate a fourth utterance sentence (<Let me know the role of KIM, Tae-hee in the drama Iris>) by combining the first utterance sentence stored in the memory 160 and the third utterance sentence received at the time T7. Here, the processing unit 150 may determine that the third utterance sentence is an extension of the first utterance sentence.

At a time T9, the processing unit 150 may output a speech recognition processing result for the fourth utterance sentence (<Let me know the role of KIM, Tae-hee in the drama Iris>) generated by combining the first utterance sentence and the third utterance sentence, for example, <The role of the KIM, Tae-hee in the drama Iris is Seung-hee>.

According to the exemplary embodiment, a delay occurring in the middle of reception of uttering speech is recognized as an uncompleted utterance to be temporarily stored and a speech recognition processing result for an additional uttering speech received after the delay is provided and then uttering speech which is input again and the uttering speech before the delay are recognized as completed utterance to provide a speech recognition processing result, thereby improving the speech recognition processing performance.

Figure 6:
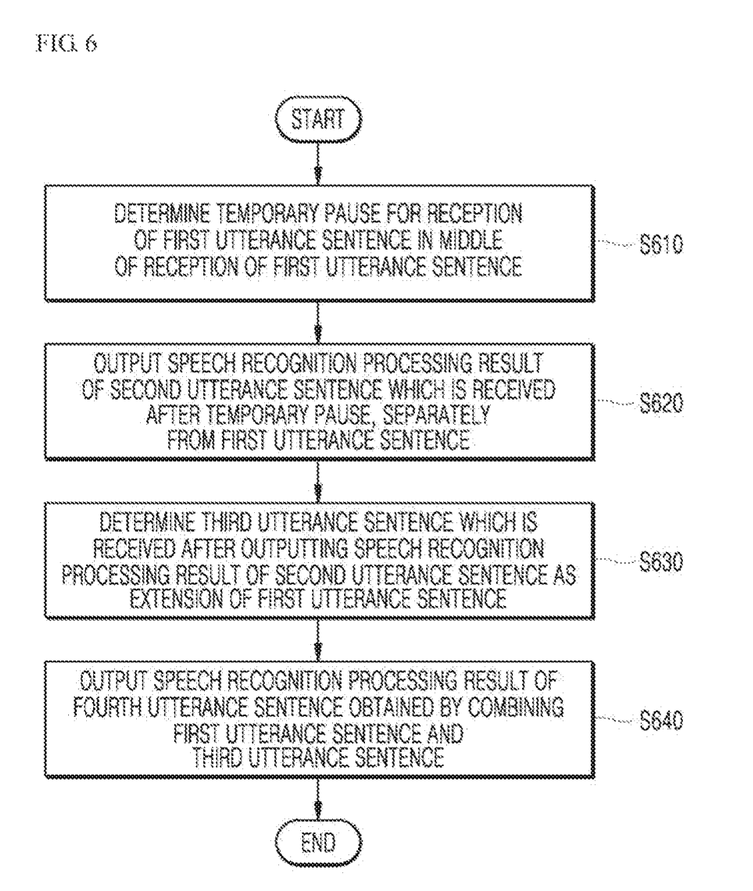
FIG. 6 is a flowchart of a speech recognition method according to an exemplary embodiment of the present disclosure.

FIG. 6 is a flowchart of a speech recognition method according to an exemplary embodiment of the present disclosure. Hereinafter, a repeated description of FIGS. 1 to 5 will be omitted.

Referring to FIG. 6, in step S610, after initiating the speech recognition active state by receiving a trigger word by the speech recognition apparatus 100, the first processing unit 152 receives a first utterance sentence as a first voice command through the audio input unit 141, recognizes a temporary pause signal for reception of the first utterance sentence in the middle of reception of the first utterance sentence, and determines a temporary pause for the reception of the first utterance sentence based on the recognition of the temporary pause signal. According to the exemplary embodiment, when a filled pause as a non-linguistic element is included in the first utterance sentence in the middle of reception of the first utterance sentence, the speech recognition apparatus 100 may determine a temporary pause for the reception of the first utterance sentence. Further, when a silent delay is generated for a predetermined time (for example, three seconds) in the middle of reception of the first utterance sentence, the speech recognition apparatus 100 may determine a temporary pause for the reception of the first utterance sentence. Further, when a predetermined keyword for determining a temporary pause is included in the first utterance sentence in the middle of reception of the first utterance sentence, the speech recognition apparatus 100 may determine a temporary pause for the reception of the first utterance sentence. When the temporary pause for the reception of the first utterance sentence is determined, the speech recognition apparatus 100 may wait for the speech recognition processing on the first utterance sentence which is received before the temporary pause and temporarily store the first utterance sentence in the memory 160. When the temporary pause for the reception of the first utterance sentence is determined, the speech recognition apparatus 100 may determine that there is an additional utterance sentence (a second utterance sentence) whose speech recognition processing result wants to be received, other than the first utterance sentence. That is, the waiting of the speech recognition processing for the first utterance sentence processed by the speech recognition apparatus 100 may be performed after the step of determining the temporary pause for the reception of the first utterance sentence and before the step of receiving the second utterance sentence.

In step S620, when the speech recognition apparatus 100 determines the temporary pause for the reception of the first utterance sentence, separately from the first utterance sentence, the speech recognition apparatus 100 receives the second utterance sentence which is received after the temporary pause and outputs the speech recognition processing result for the second utterance sentence. Here, the speech recognition apparatus 100 may maintain the speech recognition active state after outputting the speech recognition processing result of the second utterance sentence. The speech recognition processing apparatus of the related art maintains the speech recognition inactive state until a next trigger word is received after outputting the speech recognition processing result for the utterance sentence. In contrast, according to the exemplary embodiment, even after outputting the speech recognition processing result of the second utterance sentence, the speech recognition active state may be maintained. This is because it is determined that an utterance sentence (a third utterance sentence) received after outputting the speech recognition processing result for an additional utterance sentence (the second utterance sentence) is an extension of the first utterance sentence. More specifically, the speech recognition active state may be maintained until the fourth processing unit 155 outputs the speech recognition processing result for a fourth utterance sentence after the second processing unit 153 outputs the speech recognition processing result for the second utterance sentence.

In step S630, after outputting the speech recognition result of the second utterance sentence, the speech recognition apparatus 100 determines the received third utterance sentence as an extension of the first utterance sentence.

In step S640, the speech recognition apparatus 100 generates a fourth utterance sentence obtained by combining the first utterance sentence which is temporarily stored in the memory 160 and the received third utterance sentence and outputs the speech recognition result of the fourth utterance sentence.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both a machine code, such as produced by a compiler, and a higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof. It should be apparent to those skilled in the art that various substitutions, changes and modifications which are not exemplified herein but are still within the spirit and scope of the present disclosure may be made.

The present disclosure is thus not limited to the example embodiments described above, and rather intended to include the following appended claims, and all modifications, equivalents, and alternatives falling within the spirit and scope of the following claims.

What is claimed is:

1. A method for controlling a speech recognition apparatus, the method comprising:

receiving, by a microphone of the speech recognition apparatus, a first utterance sentence including a plurality of words spoken by a user corresponding to at least part of a first voice command;

determining, by a controller of the speech recognition apparatus, a temporary pause during a middle of reception of the first utterance sentence;

outputting, by a speaker device of the speech recognition apparatus, a first speech recognition processing result including a first answer to a second utterance sentence which is received after the temporary pause, separately from the first utterance sentence, the second utterance sentence corresponding to a second voice command from the user;

determining, by the controller, a third utterance sentence as an extension of the first voice command, the third utterance sentence being received after the outputting of the first speech recognition result of the second utterance sentence;

outputting, by the speaker device, a second speech recognition processing result including a second answer to a fourth utterance sentence obtained by combining the first utterance sentence and the third utterance sentence; and training, by the controller, a neural network based on the second speech recognition processing result, wherein the second answer is different than the first answer.

2. The method according to claim 1, wherein the determining the temporary pause includes:

recognizing a temporary pause signal for the reception of the first utterance sentence when a filled pause as a non-linguistic element is included in the first utterance sentence in the middle of the reception of the first utterance sentence; and determining the temporary pause for the reception of the first utterance sentence based on the recognition of the temporary pause signal.

3. The method according to claim 2, wherein the recognizing the temporary pause signal for the reception of the first utterance sentence includes:

recognizing one or more words from the first utterance sentence;

comparing the one or more words with a word of a previously built filled pause dictionary; and determining the one or more words as the temporary pause signal for the reception of the first utterance sentence when the one or more words coincide with the word of the filled pause dictionary as a comparison result.

4. The method according to claim 1, wherein the determining the temporary pause includes:

determining the temporary pause for the reception of the first utterance sentence when a silent delay occurs for a predetermined time in the middle of the reception of the first utterance sentence.

5. The method according to claim 1, wherein the determining the temporary pause includes:

determining the temporary pause for the reception of the first utterance sentence when a predetermined keyword for determining the temporary pause is included in the first utterance sentence in the middle of the reception of the first utterance sentence.

6. The according to claim 1, further comprising:

waiting for speech recognition processing for the first utterance sentence received before the temporary pause when the temporary pause for the reception of the first utterance sentence is determined.

7. The according to claim 1, further comprising:

initiating a speech recognition active state by receiving a trigger word before receiving the first utterance sentence.

8. The according to claim 7, further comprising:

maintaining the speech recognition active state after the outputting the first speech recognition result of the second utterance sentence.

9. A non-transitory computer-readable recording medium in which a computer program which executes the method according to claim 1, using a computer is stored.

10. A speech recognition apparatus, comprising:

a microphone configured to sense spoken utterances from a user;

a memory configured to store the spoken utterances;

a speaker device configured to output at least one audio response corresponding to one or more of the spoken utterances; and a controller configured to:

receive, via the microphone, a first utterance sentence including a plurality of words spoken by the user corresponding to at least part of a first voice command;

store the first utterance sentence in the memory;

determine a temporary pause during a middle of reception of the first utterance sentence;

output, via the speaker device, a first speech recognition processing result including a first answer to a second utterance sentence which is received after the temporary pause, separately from the first utterance sentence, the second utterance sentence corresponding to a second voice command from the user;

determine a third utterance sentence as an extension of the first voice command, the third utterance sentence being received after the outputting of the first speech recognition result of the second utterance sentence;

output, via the speaker device, a second speech recognition processing result including a second answer to a fourth utterance sentence obtained by combining the first utterance sentence and the third utterance sentence; and train a neural network based on the second speech recognition processing result, wherein the second answer is different than the first answer.

11. The speech recognition apparatus according to claim 10, wherein the controller is configured to recognize a temporary pause signal for the reception of the first utterance sentence when a filled pause as a non-linguistic element is included in the first utterance sentence in the middle of the reception of the first utterance sentence and determine the temporary pause for the reception of the first utterance sentence based on the recognition of the temporary pause signal.

12. The speech recognition apparatus according to claim 11, wherein the controller is configured to recognize one or more words from the first utterance sentence, compare the one or more words with a word of a previously built filled pause dictionary, and determine the one or more words as the temporary pause signal for the reception of the first utterance sentence when the one or more words coincide with the word of the filled pause dictionary as a comparison result.

13. The speech recognition apparatus according to claim 10, wherein the controller is configured to determine the temporary pause for the reception of the first utterance sentence when a silent delay occurs for a predetermined time in the middle of the reception of the first utterance sentence.

14. The speech recognition apparatus according to claim 10, wherein the controller is configured to determine the temporary pause for the reception of the first utterance sentence when a predetermined keyword for determining the temporary pause is included in the first utterance sentence in the middle of the reception of the first utterance sentence.

15. The speech recognition apparatus according to claim 10, wherein the controller is configured to wait for speech recognition processing for the first utterance sentence received before the temporary pause when the temporary pause for the reception of the first utterance sentence is determined.

16. The speech recognition apparatus according to claim 10, wherein the controller is configured to initiate a speech recognition active state by receiving a trigger word before receiving the first utterance sentence.

17. The speech recognition apparatus according to claim 16, wherein the controller is configured to maintain the speech recognition active state after outputting the second speech recognition result of the second utterance sentence.

18. A non-transitory computer-readable recording medium in which a computer program which executes the method according to claim 2, using a computer is stored.

19. A non-transitory computer-readable recording medium in which a computer program which executes the method according to claim 3, using a computer is stored.

20. A non-transitory computer-readable recording medium in which a computer program which executes the method according to claim 4, using a computer is stored.

* * * * *